United States Patent Office 3,836,482
Patented Sept. 17, 1974

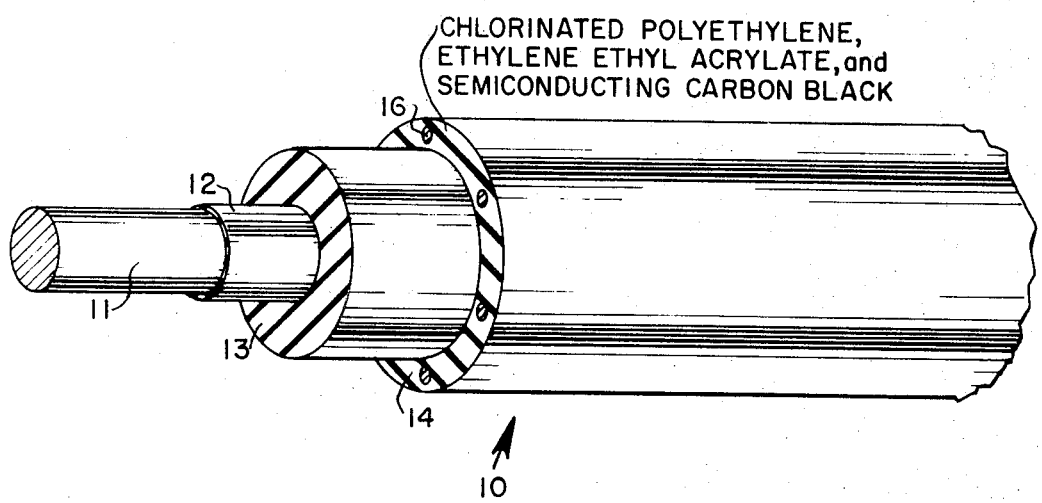

3,836,482
SEMICONDUCTING COMPOSITION OF CHLORINATED POLYOLEFIN, ETHYLENE ETHYL ACRYLATE AND SEMICONDUCTING CARBON BLACK
Ting H. Ling, Marion, Robert M. Wade, Wabash, and Marwick H. Solomon, Muncie, Ind., assignors to The Anaconda Company
Original application July 30, 1971, Ser. No. 167,741, now Patent No. 3,735,025. Divided and this application Feb. 15, 1973, Ser. No. 332,829
Int. Cl. H01b 1/06
U.S. Cl. 252—511                                6 Claims

ABSTRACT OF THE DISCLOSURE

Electrical cables are jacketed with a novel thermoplastic semiconducting composition comprising chlorinated polyethylene, ethylene ethyl acrylate and carbon black.

This is a division of application Ser. No. 167,741 filed July 30, 1971, now Pat. 3,735,025.

BACKGROUND OF THE INVENTION

Polymeric compositions that will conduct electricity have utility for a number of purposes, varying from the discharge of frictionally induced electrostatic charges on plastic surfaces where such charges cause an accumulation of dust, to the transmission of useful currents by the conductors of ignition cables. The conductivity of polymeric compositions does not equal that of metals since the composition resistivities usually vary from about 1 to 10,000 ohm-centimeters. For this reason such compositions are usually referred to as semiconducting as they shall be in this application. A recent commercial interest in electric cables with semiconducting jackets, particularly for direct burial, has been stimulated by the development of cables of a type described in Pat. 3,474,189. These cables have drain wires embedded in a semiconducting outer jacket that provides both electrical shielding and mechanical protection. Modern cables for burial service employ vulcanized compositions such as vulcanized polyethylene for insulation. This means that they have higher temperature ratings than thermoplastic-insulated cables. Fully to utilize the higher thermal ratings of vulcanized insulation the jackets of the cables should be equally highly rated and, what is even more exacting as a requirement for this modern type of cable, the electrical conductivity of the cable jackets should remain high through the whole service temperature range. Attempts have been made to meet these requirements with vulcanized semiconducting jackets. But vulcanized compounds, when used for jacket stocks, have the serious disadvantage that they bond firmly to the surface of the insulation and cannot be readily stripped clean at splices and terminations. Further requirements for jacket compositions for buried cables, which presently known materials do not fully meet, include extrudability at high manufacturing speeds. This has particular significance for the embedded drain wire cables since the jackets can then be applied in tandem with the insulation extrusion without slowing down the former. The composition must, in adddition, retain its properties in water and other commonly encountered solvents, and resist burning. Significantly, since cables are buried with a view to service for many years the jacket composition must age exceptionally well, i.e. retain its good characteristics after thousands of cycles of heating and cooling and years of burial. No compositions are presently known fully to satisfy all the enumerated requirements for cable jacketing.

SUMMARY

We have invented a composition which is thermoplastic and so will not bond to cable insulation but is serviceable at elevated temperatures, retains its electrical conductivity under adverse conditions, as shall be shown, and can be extruded at high speed. Our composition comprises a homogenous blend of 10–90 or, more preferably 50–80, or particularly 60–75 parts by weight of a chlorinated polyolefin such, preferably, as polyethylene; the difference to make up 100 parts by weight of ethylene ethyl acrylate; and 30–75 or, more preferably 40–60, or particularly 45–55 parts by weight of semiconducting carbon black.

We have invented an electric cable comprising a conductor, a layer of polymeric insulation such, preferably as vulcanized polyethylene, surrounding the conductor, and a semiconducting thermoplastic polymeric jacket directly surrounding the insulation. The jacket comprises 50–80 or, preferably, 65–75 parts by weight of chlorinated polyethylene, the difference to make 100 parts by weight of ethylene ethyl acrylate, and 40–60 or, preferably, 45–55 parts by weight of semiconducting carbon black.

DESCRIPTION OF THE DRAWING

The figure shows a pictorial lengthwise view of a cable of our invention.

DETAILED DESCRIPTION OF PREFERRED EMBODIMENTS

In the figure a cable suitable for underground power service is indicated generally by the numeral 10. In the cable 10 a conductor 11, which may be stranded, is covered in known manner by a layer 12 of semiconducting strand shielding composition. The conductor, including the layer 12 is insulated with a surrounding layer 13 of vulcanized polyethylene. Our invention has particular utility where the insulation 13 is vulcanized because the cable can then make most advantage of the high-temperature properties of the jacket, to be described. Other vulcanized compositions, such as ethylene propylene copolymers or diene terpolymers can also be employed within the scope of our invention, and, of course, certain advantages will still accrue where the insulation is thermoplastic, such as thermoplastic polyolefin, although, generally, the temperature rating will then be lower.

Over the insulation layer 13 there is directly extruded a thermoplastic semiconducting jacket 14 into which drain wires have been embedded during the extrusion operation. Since the jacket 14 is in direct surface contact with the insulation 13 it would bond to the insulation if both were vulcanized. An advantage of our cable resides in the fact that the thermoplastic jacket can always be cleanly stripped, even from a vulcanized layer of insulation.

EXAMPLE

|  | Parts by weight |
|---|---|
| Chlorinated polyethylene | 70 |
| Ethyl ethylene acrylate | 30 |
| Semiconducting carbon black | 50 |
| Lead phthalate | 4 |
| Epoxy resin | 2 |
| Lead stearate | 1 |
| Antioxidant | 0.5 |
| Flame retarder | 5 |

The chlorinated polyethylene of the example was obtained from Dow Chemical Company under the designation 2243.28, with a chlorine content of 25%, crystallinity of 28% and specific gravity of 1.08. Although we prefer to use chlorinated polyethylene with chlorine contents of 20–30% our invention includes chlorine contents of 15–70%.

The ethylene ethyl acrylate of the example was supplied by the Union Carbide Plastics Company under the designation DPD-6169 having an ASTM D638 stiffness of 5000 p.s.i., an ASTM D1505 density of 0.93 grams per cc. and an ASTM D1238 melt index of 6.0 grams/10 minutes. The term ethylene ethyl acrylate, as used in this application applies to copolymers of ethylene and ethyl acrylate, which are commercially available with combined ethyl acrylate contents of about 3–25% by weight.

The semiconducting carbon black of the example was supplied by Godfrey L. Cabot, Inc. under the designation Vulcan XC-72. Semiconducting carbon blacks suitable for the practice of our invention are, however, commercially available from a number of sources known to persons skilled in plastic compounding arts.

The lead phthalate and stearate serve as stabilizers and the epoxy as an extrusion lubricant. For the additional flame retarder of the example antimony oxide can be used or "Dechlorane" furnished by the Hooker Electrochemical Company, and a suitable antioxidant is polymerized 1,2-dihydro-2,2,4-trimethylquinoline. Other suitable antioxidants, of which a number are well known to plastic compounders can also be used within the scope of our invention. Other suitable compounding agents are known that can be employed within the scope of our invention which is not limited except as hereinafter specifically claimed.

Resistivity tests of the composition of the example were conducted over a period of five weeks in accordance with the following schedule: specimens were aged in a 90° C. oven from 4:30 p.m. to 8:30 a.m. each weekday and over the Friday to Monday weekend. From 8:30 a.m. to 11:30 a.m. each weekday they were aged in a 130° C. oven. From 11:30 a.m. to 4:30 p.m. they were permitted to cool at room temperature. Resistivity measurements were made each weekday at 8:05 a.m. while the samples were in the 90° C. oven, at 11:05 a.m. while they were in the 130° C. oven and at 4 p.m. at room temperature.

Values of the resistivities obtained are shown in Table I.

TABLE I

| Week | Day | Resistivity (ohm-cm.) at— | | |
|---|---|---|---|---|
| | | 90° C. | 130° C. | Room temp. |
| 1st | Monday | 935 | 2,630 | 190 |
| | Friday | 840 | 2,040 | 158 |
| 2nd | Monday | 740 | 2,130 | 171 |
| | Friday | 757 | 1,750 | 167 |
| 3rd | Monday | 610 | 1,670 | 149 |
| | Friday | 650 | 1,320 | 147 |
| 4th | Monday | 528 | 1,350 | 148 |
| | Friday | 612 | 1,680 | 153 |
| 5th | Monday | 510 | 1,380 | 151 |
| | Friday | 493 | 1,390 | 152 |

The data of Table I evidenced an unexpected improvement in conductivity of our composition with aging, over a wide range of temperatures.

Specimens of cable jacketed with our composition made in accordance with the example and specimens jacketed with semiconducing polyethylene were tested for resistivity of the jacket at different temperatures by holding the specimens in an air oven for two hours at each temperature. The results are shown in Table II.

TABLE II

| Temp., °C. | Ohm-cm. | |
|---|---|---|
| | Polyethylene | Example |
| 25 | 162 | 235 |
| 50 | 4,610 | 671 |
| 75 | 29,700 | 900 |
| 100 | 5,980,000 | 1,820 |
| 130 | 8,710 | 5,030 |
| 150 | 3,500 | 2,520 |

The resistivity of the composition of the example is seen not to rise excessively upon hot water immersion by the data of Table III. Measurements were made at room temperature.

TABLE III

| Weeks water immersion at 90° C.: | Resistivity, ohm-cm. |
|---|---|
| 0 | 185 |
| 1 | 2750 |
| 2 | 4710 |
| 4 | 6710 |

After four weeks immersion in different solutions and solvents the resistivity of the composition of the example did not rise unduly, as shown in Table IV.

TABLE IV

| Solution or solvent: | Resistivity, ohm-cm. |
|---|---|
| 30% sulfuric acid | 951 |
| 10% nitric acid | 967 |
| 10% hydrochloric acid | 603 |
| 5% acetic acid | 765 |
| 10% sodium hydroxide | 884 |
| Gasoline | 525 |
| Acetone | 253 |
| Ethylene dichloride | 318 |
| Heptene | 547 |
| ASTM #2 oil | 766 |
| Transformer oil | 622 |

The resistance to heat deformation of the composition of the example is shown in Table V to be superior at elevated temperatures to that of semiconducting polyethylene or of polyvinyl chloride jacket stock.

TABLE V

| | Percent heat deformation at— | | | |
|---|---|---|---|---|
| | 70° C. | 90° C. | 121° C. | 150° C. |
| Semiconducting polyethylene | 0 | 2.63 | 100 | |
| Polyvinyl chloride | 2.84 | 4.75 | 13.64 | 61.30 |
| Example | 2.80 | 4.88 | 5.58 | 53.30 |

We have invented a new and useful cable and composition of which the foregoing description has been exemplary rather than definitive and for which we desire an award of Letters Patent as defined in the following claims.

We claim:

1. A composition of matter comprising a homogeneous blend of 10–90 parts by weight of chlorinated polyolefin, 90–10 parts by weight ethylene ethyl acrylate, the sum of chlorinated polyolefin and ethylene ethyl acrylate to equal 100 parts by weight, and 30–75 parts by weight of semiconducting carbon black.

2. The composition of claim 1 comprising 50–80 parts by weight of chlorinated polyolefin and 40–60 parts by weight of said carbon black.

3. The composition of claim 1 comprising 65–75 parts by weight of chlorinated polyolefin and 45–55 parts by weight of said carbon black.

4. The composition of claim 1 wherein said polyolefin comprises polyethylene.

5. The composition of claim 2 wherein said polyolefin comprises polyethylene.

6. The composition of claim 3 wherein said polyolefin comprises polyethylene.

References Cited

UNITED STATES PATENTS

| | | | |
|---|---|---|---|
| 3,510,448 | 5/1970 | Byler et al. | 252—511 X |
| 3,155,631 | 11/1964 | Zapr | 252—511 X |

FOREIGN PATENTS

| | | | |
|---|---|---|---|
| 1,373,039 | 6/1963 | France | 252—511 |
| 1,012,863 | 9/1962 | Great Britain | 252—511 |

OTHER REFERENCES

Ohe, K. et al.: Japanese J. of App. Physics, vol. 10, No. 1, pp. 99–108.

CARL D. QUARFORTH, Primary Examiner

R. E. SCHAFER, Assistant Examiner

U.S. Cl. X.R.

260—884, 897 C, 899